(12) United States Patent
Zhou et al.

(10) Patent No.: US 11,793,219 B2
(45) Date of Patent: Oct. 24, 2023

(54) METHOD FOR RAPID LOW-SALTED PICKLING OF AQUATIC PRODUCT

(71) Applicant: Zhejiang University of Technology, Hangzhou (CN)

(72) Inventors: Xuxia Zhou, Hangzhou (CN); Yuting Ding, Hangzhou (CN); Zhigang Ke, Hangzhou (CN); Yicheng Ding, Hangzhou (CN); Wenjie Wang, Hangzhou (CN); Qi Zhang, Hangzhou (CN); Hao Zhu, Hangzhou (CN); Yushan Chu, Hangzhou (CN)

(73) Assignee: Zhejiang University of Technology, Hangzhou (CN)

( * ) Notice: Subject to any disclaimer, the term of this patent is extended or adjusted under 35 U.S.C. 154(b) by 0 days.

(21) Appl. No.: 17/648,604

(22) Filed: Jan. 21, 2022

(65) Prior Publication Data
US 2022/0240551 A1 Aug. 4, 2022

(30) Foreign Application Priority Data
Jan. 29, 2021 (CN) .......................... 202110130300.1

(51) Int. Cl.
*A23L 3/26* (2006.01)
*A23L 17/00* (2016.01)
*A23L 3/3508* (2006.01)
*A23L 3/358* (2006.01)

(52) U.S. Cl.
CPC ................ *A23L 3/26* (2013.01); *A23L 3/358* (2013.01); *A23L 3/3508* (2013.01); *A23L 17/00* (2016.08)

(58) Field of Classification Search
CPC .......... A23L 3/26; A23L 3/263; A23L 3/3508; A23L 3/358; A23L 5/30; A23B 4/015; A23B 4/126; B01D 53/32
See application file for complete search history.

(56) References Cited

FOREIGN PATENT DOCUMENTS

| CN | 110810747 A | * | 2/2020 | |
| WO | WO-2016140447 A1 | * | 9/2016 | ............. A23B 4/015 |

* cited by examiner

*Primary Examiner* — Changqing Li
(74) *Attorney, Agent, or Firm* — Schwegman Lundberg & Woessner, P.A.

(57) ABSTRACT

A method for rapid low-salted pickling of aquatic products is disclosed, which includes preliminary processing of raw materials, bacteria-reducing treatment of plasma activation gas, marinade adding and plasma treatment, cyclic bacteria-reducing treatment with the plasma activation gas and vacuum pickling. The marinade adding and plasma treatment include respectively injecting the marinade and plasma working gas into a tumbler, with a flow rate of ionic working gas injected into the tumbler of 1.5-2 L/min and a flow rate of a pickling solution of 0.5-0.8 L/min: and at the same time, starting a plasma power supply, and performing low-temperature plasma treatment on the aquatic products to be pickled, with a plasma treatment voltage of 12000-15000 V, a current of 60-80 mA, a frequency of 8-10 kHz, which is a second bacteria-reducing treatment, with plasma treatment time of 15-20 min.

10 Claims, 1 Drawing Sheet

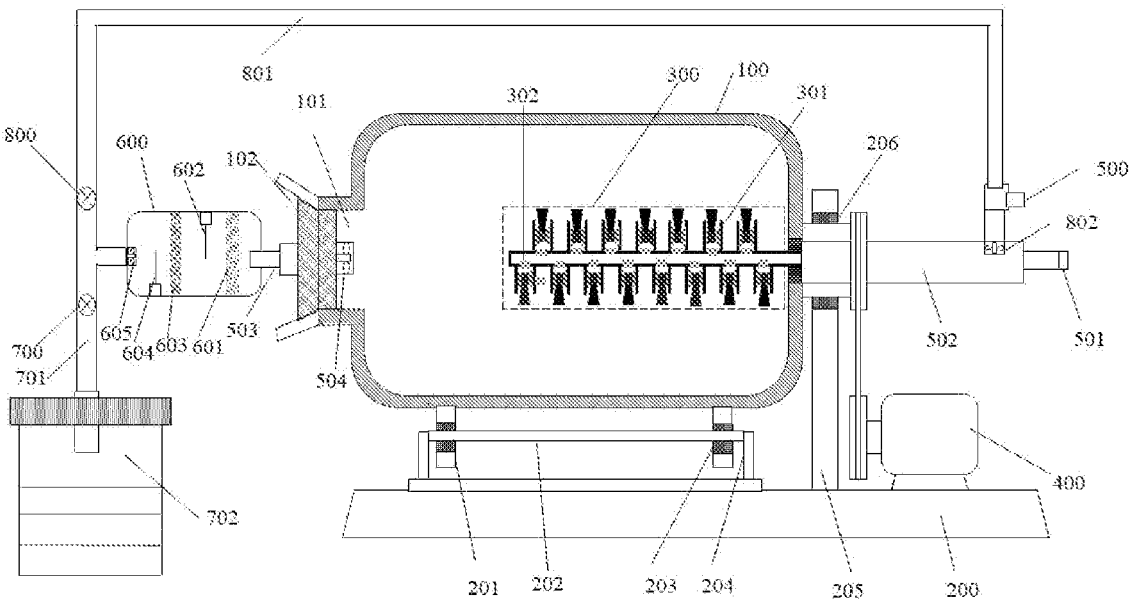

METHOD FOR RAPID LOW-SALTED PICKLING OF AQUATIC PRODUCT

CROSS-REFERENCE TO RELATED APPLICATIONS

This Non-provisional application claims priority under 35 U.S.C. § 119(a) to Chinese Patent Application No. 202110130300.1, filed on 29 Jan. 2021, the entire contents of which are hereby incorporated by reference in its entirety.

TECHNICAL FIELD

The disclosure belongs to a field of food processing equipment and technology, and relates to a method for rapid low-salted pickling of aquatic products.

BACKGROUND ART

Pickling refers to a processing process that uses salt and other marinades to process food materials to increase flavor, improve texture and facilitate preservation, which is an effective method for processing and preserving aquatic products with strong Chinese characteristics. Its principle is as follows: in an environment of high concentration of salt, water in the muscle cells of the aquatic products permeates into the salt solution, and at the same time, the salt in the solution diffuses into the muscle, which finally makes the muscle dehydrated, contracted and tough. For microorganisms, dehydration leads to plasmolysis, which affects their normal physiological and metabolic activities and inhibits their growth and reproduction, thus prolonging shelf life of the aquatic products. In addition, under actions of protease and halophilic bacteria lipolytic enzyme, protein and fat in the aquatic products are decomposed into peptides, amino acids, volatile aldehydes, etc., which enables the pickled aquatic products to have special flavor.

Traditional pickling of the aquatic products usually adopts a high-salt method (salt content of the products is 15-20%). By increasing the salt concentration in the salting solution, diffusion and penetration rates can be increased, thus accelerating a pickling process and improving bacteriostatic effect. However, more salt will change color, flavor and taste of the pickled products to a certain extent, and is not good for human health, which does not meet current consumer's demands of moderate saltiness, nutrition and safety. Therefore, it is urgent to adopt modern processing technologies to innovate the pickling method of the aquatic products to reduce the salt content, without a pickling speed being reduced or the bacteriostatic effect being changed.

Plasma refers to a mixed system after gas is partially or completely ionized into electrons, positive and negative ions, atoms or molecules in a ground state and an excited state under an action of heating or strong electromagnetic field, which is a fourth state of existence of matter. Low temperature plasma is a kind of plasma, in which temperatures of ions and neutral particles are much lower than that of electrons, and a temperature of the whole system is close to a room temperature. In a process of low-temperature plasma treatment, in addition to the above-mentioned particles, ultraviolet radiation, an electric field, reactive chemical groups (including reactive oxygen groups (ROS) and reactive nitrogen groups (RNS)) will also be generated. Currently, in a field of food processing, researches of this technology mainly focus on prolonging the shelf life with its bactericidal property, and there is no related research reported on its application in pickling of the aquatic products.

SUMMARY

An object of the disclosure is to provide a device and method for rapid low-salted pickling of aquatic products. Plasma technologies are applied to pickling of the aquatic products in this disclosure to solve problems in existing fish pickling such as a slow pickling speed, a high salt concentration, ineffective inhibition of microbial reproduction and the like.

In order to achieve the above object, the disclosure adopts following technical schemes.

A device for rapid low-salted pickling of aquatic products is provided, which includes a pickling device, a plasma system and a gas circulation system. The pickling device includes a tumbler, a vacuum pump and a supporting mechanism. The plasma system includes a plasma generating device, a plasma power supply and a controller. The gas circulation system includes a gas inlet, a gas inlet pipe, an extraction fan, an extraction pipe, a gas treatment device and an exhaust fan.

Preferably, the plasma generating device is a low-temperature plasma generating device, including dielectric barrier discharge, arc discharge or corona discharge, and is connected with the plasma power supply and a control system via wires passing through the gas inlet pipe.

Preferably, the gas inlet pipe is a hollow stainless steel pipe composed of two tubes, the gas inlet pipe extends to inside of the tumbler through a rotating roller, the outer end of the gas inlet pipe is provided with a gas inlet, and a marinade inlet is provided beside the gas inlet, and a plurality of gas outlets are provided at a part of an interior of the tumbler, a nozzle is provided at each of the gas outlets, each nozzle is directly below the plasma generating device. Numbers of nozzles and plasma generating devices can be selected according to size requirements of the system and actual situations.

Preferably, marinade and working gas are introduced into the tumbler via the marinade inlet and the gas inlet respectively. The marinade consists of 20-30 parts of salt, 5-8 parts of potassium chloride. 1.5-4.5 parts of citric acid, 20-30 parts of white wine, 1-2 parts of fennel powder, 3-5 parts of pepper powder and 470-500 parts of water, a flow rate of the marinade is 0.5-0.8 L/min, the gas is injected at a flow rate of 1.5-2 L/ruin. The gas passes through the gas inlet pipe and is sprayed by the nozzle through the plasma generating device to be evenly distributed on surfaces of the aquatic products to be pickled, and the working gas used can be one of air, nitrogen, oxygen or argon.

Preferably, the extraction fan is fixed at an inner position of a bucket cover of the tumbler, and is connected with the outer gas treatment device through a vacuum interface/gas outlet in a middle of the bucket cover.

Preferably, the gas treatment device is internally provided with a nitrogen and oxygen adsorption device, a nitrogen and oxygen detector, an ozone decomposition device, an ozone concentration detector, etc., so as to monitor and control oxygen and nitrogen and ozone concentration in plasma activation gas.

Preferably, an exhaust pipe is provided inside the gas treatment device and connected with the extraction pipe, and the extraction pipe is divided into two branches, one of which is communicated with a holding device (i.e., a material pretreatment bucket) of the aquatic products before pickling, and the other of which is communicated with the exhaust fan, so that the treated plasma activation gas extracted by the exhaust fan is introduced into the material pretreatment bucket or reinjected into the tumbler.

Preferably, the supporting mechanism includes a base, a rotor, a connecting rod, a first bearing, an upright post, a supporting frame and a second bearing.

Preferably, the supporting frame fixes the second bearing, the upright post fixes the connecting rod, and the connecting rod passes through a plurality of first bearings and is made into the tumbler, and the gas inlet pipe passes through the second bearing and extends into the tumbler.

A method for rapid low-salted pickling of aquatic products based on the device is further provided in this disclosure, which includes following steps:

1) Preliminary processing of raw materials and bacteria-reducing treatment with the plasma activation gas, in which inedible parts of aquatic products to be pickled are removed, the aquatic products are cut into pieces after cleaning and put into a material pretreatment bucket, and at the same time, gas valves in gas circulation pipelines of a gas treatment device and a tumbler are closed, and plasma activation gas extracted from inside of the tumbler is input into the material pretreatment bucket, which is a first bacteria-reducing treatment before pickling the aquatic products.

2) Marinade adding and plasma treatment, in which a pickling solution is prepared in a sterile environment, which consists of 20-30 parts of salt, 5-8 parts of potassium chloride, 1.5-4.5 parts of citric acid, 20-30 parts of white wine, 1-2 parts of fennel powder, 3-5 parts of pepper powder and 470-500 parts of water, which are mixed evenly, with final salt content less than 12%; the marinade and plasma working gas are respectively injected into the tumbler through a marinade inlet and a gas inlet, the plasma working gas is air, and a flow rate of the air injected into the tumbler is 1.5-2 L/min, and a flow rate of the marinade is 0.5-0.8 L/min; at the same time, a plasma power supply is started, and low-temperature plasma treatment is performed on the aquatic products to be pickled, with a plasma treatment voltage of 12000-15000 V, a current of 60-80 mA, a frequency of 8-10 kHz, and treatment time of 15-20 min. This is a second bacteria-reducing treatment, which not only accelerates a speed of the marinade entering muscle cells of the aquatic products, but also effectively reduces content of spoilage microorganisms on surfaces of the aquatic products.

3) Cyclic bacteria-reducing treatment with the plasma activation gas, in which after the plasma treatment is finished, the gas valves between the extraction pipe and the material pretreatment bucket are closed, the extraction fan and the exhaust fan are opened, and then e plasma activation gas extracted from inside of the tumbler is passed through the exhaust fan, a gas purification device and the gas inlet to re-enter into the tumbler to form gas circulation, and this is the third bacteria-reducing treatment, with treatment time of 20-30 min.

4) Vacuum pickling, in which after the third bacteria-reducing treatment is completed, the vacuum interface/gas outlet is connected with a vacuum pump at a bucket cover of the tumbler and the tumbler is vacuumized, and the tumbler is kept being rotated to vacuum pickle the aquatic products therein for 2-3 hours, with a vacuum degree of 0.05-0.20 MPa and a rotating speed of 4-10 r/min.

5) Sampling and cleaning, in which after the pickling is finished, the pickled aquatic products are taken out, clean water is injected into the tumbler through the marinade inlet and the tumbler is rotated to clean the tumbler.

6) drying and packaging, in which the products is dried by a heat pump, and the products after drying are vacuum packaged to obtain the dried products.

Preferably, conditions of the first bacteria-reducing treatment in step 1) are the same as those of the second bacteria-reducing treatment in step 2). The disclosure includes following beneficial effects.

According to the disclosure, the low-temperature plasma assisted tumbler is used for pickling the aquatic products, and various physical/chemical factors generated by the plasma are used to increase permeability of the muscle cell membrane and gaps between tissues of the aquatic products, thereby promoting diffusion of the marinade, penetration of the water and dissolution of salt-soluble proteins, thus shortening pickling time without affecting sensory characteristics of the pickled products. In addition, with a strong ability of the low-temperature plasma and the plasma activation gas to kill microorganisms and three bacteria-reducing treatments being carried out in the pickling process of aquatic products, various microorganisms, including molds and yeasts that can only be inhibited under a high salt concentration, attached to the aquatic products are effectively killed, thus effectively controlling growth and reproduction of the microorganisms even under a low salt concentration, and ensuring quality, safety, and shelf life of the low-salted pickled aquatic products.

BRIEF DESCRIPTION OF THE DRAWINGS

FIG. 1 is a schematic diagram of a device for rapid low-salted pickling according to the present disclosure.

Reference Number: 100. Tumbler, 101. Material Inlet/Outlet, 102. Bucket Cover, 200. Base, 201. Rotor, 202, Connecting Rod, 203, First Bearing, 204. Upright Post, 205. Supporting Frame, 206. Second Bearing, 300. Plasma Generating Device, 301. Electrode, 302. Nozzle, 400. Plasma Power Supply and Control System, 500. Gas Inlet, 501. Marinade Inlet, 502. Gas Inlet Pipe, 503. Vacuum Interface/Gas Outlet, 504. First Exhaust Fan. 600. Gas Treatment Device, 601. Nitrogen and Oxygen Adsorption Device, 602. Nitrogen and Oxygen detector, 603. Ozone Decomposition Device, 604. Ozone Concentration Detector, 605. Second Exhaust Fan. 700. Intake Valve of Material Pretreatment Bucket, 701. Gas Inlet Pipe of Material Pretreatment Bucket, 702. Material Pretreatment Bucket; 800. Gas Circulation Control Valve of Tumbler, 801. Gas Circulation Pipe of Tumbler, 802. Extraction Fan.

DETAILED DESCRIPTION

The present disclosure will be further explained with reference to specific embodiments and drawings in the following.

Embodiment 1

As shown in FIG. 1, a device for rapid low-salted pickling of aquatic products according to the present disclosure includes a pickling device, a plasma treatment device and a gas circulation system. The pickling device includes a tumbler 100, a material inlet/outlet 101, a bucket cover 102, a base 200, a rotor 201, a connecting rod 202, a first bearing 203, a upright post 204, a supporting frame 205, a second bearing 206. The bucket cover 102 is provided with a vacuum interface/gas outlet 503, and a first exhaust fan 504 is provided at a position facing an inner side of the tumbler. The plasma device includes a plasma generating device 300 and a plasma power supply and control system 400. The plasma generating device 300 includes an electrode 301 and a nozzle 302, and the electrode 301 is connected with the plasma power supply and control system 400 by a wire passing through a gas inlet pipe 502. The gas circulation system includes a gas inlet 500, a gas inlet pipe 502, a vacuum interface/gas outlet 503, a first exhaust fan 504, a gas treatment device 600, a material pretreatment bucket 702, a gas circulation pipeline 801 of the tumbler, etc. The gas treatment device 600 is provided with a nitrogen and oxygen gas adsorption device 601, a nitrogen and oxygen gas detector 602, an ozone decomposition device 603 and an ozone concentration detector 604, so as to monitor and control concentrations of nitrogen, oxygen and ozone in the plasma activation gas. A second exhaust fan 605 is also installed in the gas treatment device 600 to guide the processed plasma activation gas into the material pretreatment bucket 702 or the gas circulation pipe of the tumbler 801, the material pretreatment bucket 702 and the plasma activation gas treatment device 600 are connected by the gas inlet pipe of the material pretreatment bucket 701 and controlled by an intake valve of the material pretreatment bucket 700. Gas circulation between a gas circulation pipe of the tumbler 801 and the gas treatment device 600 is controlled by a gas circulation control valve of the tumbler 800, and the circulating gas is introduced into the tumbler 100 by an extraction fan 802 so as to realize the gas circulation.

The pickling solution for pickling in the disclosure consists of 20-30 parts of salt, 5-8 parts of potassium chloride, 1.5-4.5 parts of citric acid, 20-30 parts of white wine, 1-2 parts of fennel powder, 3-5 parts of pepper powder and 470-500 parts of water, which are mixed evenly, with final salt content less than 12%.

Embodiment 2

A method for rapid low-salted pickling of aquatic products based on the device specifically includes following steps:

1) Preliminary processing of raw materials in which inedible parts of fish meat to be pickled are removed, cleaned, cut into 5 cm×2 cm×2 cm pieces, and put into a material pretreatment bucket.

2) bacteria-reducing treatment with the plasma activation gas, in which the plasma power supply and control system is turned on to perform low-temperature plasma treatment on the pieces to be pickled in the pretreatment bucket. A plasma treatment voltage is 15000 V with a current of 60 mA and a frequency of 10 kHz. The plasma working gas is air, and a flow rate of the air injected into the tumbler is 1.5 L/min. The exhaust fan 504 is turned on, and the plasma activation gas in the tumbler is introduced into the gas treatment device 600. The nitrogen and oxygen adsorption device and the concentration detector, as well as the ozone decomposition device and the concentration detector are used to control concentration of the nitrogen and oxygen, and ozone ranging from several hundred ppb to several tens ppm. The exhaust fan 605 and the intake valve 700 of the material pretreatment bucket are turned on, and the gas circulation control valve 800 of the tumbler is turned off at the same time, and the processed plasma activation gas is introduced into the material pretreatment bucket to perform the bacteria-reducing treatment on the pieces to be pickled for 20 min.

3) Marinade adding and plasma treatment, in which the pieces which have been subjected to the bacteria-reducing treatment with the plasma activation gas are put into the tumbler for further pickling treatment. The marinade is prepared by adding salt and other ingredients to ultrapure water, with salt content less than 12% (the added salt accounted for about 5% of the total fish meat). The prepared marinade is injected into a cavity of the tumbler together with the plasma working gas through the marinade inlet, and low-temperature plasma treatment is performed at the same time, with same treatment conditions as those described in step (2). In this step, the intake valve 700 of the material pretreatment bucket is turned off, and the gas circulation control valve 800 of the tumbler is turned off, so that the pieces to be pickled in the material pretreatment bucket are subjected to the first bacteria-reducing treatment and the pieces in the tumbler are subjected to the second bacteria-reducing treatment.

4) Cyclic bacteria-reducing treatment with the plasma activation gas, in which after the plasma treatment is finished, the intake valve 700 of the material pretreatment bucket between the gas treatment device and the material pretreatment bucket is turned off, the gas circulation control valve 800 of the tumbler is turned on, and the plasma activation gas extracted from inside of the tumbler is passed through the exhaust fan and the gas inlet to re-enter into the tumbler to form gas circulation, and this is the third bacteria-reducing treatment performed on the pieces. The treatment time is 30 min.

5) Vacuum pickling, in which after the bacteria-reducing treatment in step (4) is completed, the vacuum interface/gas outlet is connected with a vacuum pump at a bucket cover 503 of the tumbler and the tumbler is vacuumized, and when a vacuum degree reaches 0.1 MPa, the tumbler is rotated at 5 r/min for pickling for 2 h. Fish meat with salt accounting for 10% of weight thereof and direct vacuum pickling for 2 hours was taken as a control.

6) Sampling and cleaning, in which after the pickling is finished, the pickled aquatic products are taken out, clean water is injected into the tumbler through the marinade inlet and the tumbler is rotated to clean the tumbler.

7) drying and packaging, in which the products is dried by a heat pump, and the products after drying are vacuum packaged to obtain the dried products.

Embodiment 3

A method for rapid low-salted pickling of aquatic products based on the device specifically includes following steps:

1) Preliminary processing of raw materials in which inedible parts of fish meat to be pickled are removed, cleaned, cut into 5 cm×2 cm×2 cm pieces, and put into a material pretreatment bucket.

2) bacteria-reducing treatment with the plasma activation gas, in which the plasma power supply and control system is turned on to perform low-temperature plasma treatment on the pieces to be pickled in the tumbler. A plasma treatment voltage is 12000 V with a current of 70 mA and a frequency of 8 kHz. The plasma working gas is air, and a flow rate of the air injected into the tumbler is 1.85 L/min. The exhaust fan 504 is turned on, and the plasma activation gas in the tumbler is introduced into the gas treatment device 600. The nitrogen and oxygen adsorption device and the concentration detector, as well as the ozone decomposition device and the concentration detector are used to control concentration of the nitrogen and oxygen, and ozone ranging from several hundred ppb to several tens ppm. The exhaust fan 605 and the intake valve 700 of the material pretreatment bucket are turned on, and the gas circulation control valve 800 of the tumbler is turned off, and the processed plasma activation gas is introduced into the material pretreatment bucket to perform the bacteria-reducing treatment on the pieces to be pickled for 15 min.

3) Marinade adding and plasma treatment, in which the pieces which have been subjected to the bacteria-reducing treatment with the plasma activation gas are put into the tumbler for further pickling treatment. The marinade is prepared by adding salt and other ingredients to ultrapure water, with final salt content less than 12% (the added salt accounted for about 5% of the total fish meat). The prepared marinade is injected into a cavity of the tumbler together with the plasma working gas through the marinade inlet, and low-temperature plasma treatment is performed at the same time, with same treatment conditions as those described in step (2). The intake valve 700 of the material pretreatment bucket is turned off, and the gas circulation control valve 800 of the tumbler is turned off, so that the pieces to be pickled in the material pretreatment bucket are subjected to the first bacteria-reducing treatment and the pieces in the tumbler are subjected to the second bacteria-reducing treatment.

4) Cyclic bacteria-reducing treatment with the plasma activation gas, in which after the plasma treatment is finished, the intake valve 700 of the material pretreatment bucket between the gas treatment device and the material pretreatment bucket is turned off, the gas circulation control valve 800 of the tumbler is turned on, and the plasma activation gas extracted from inside of the tumbler is passed through the exhaust fan 605 and the gas circulation pipe of the tumbler 801 to re-enter into the tumbler to form gas circulation, and this is the third bacteria-reducing treatment performed on the pieces. The treatment time is 20 min.

5) Vacuum pickling, in which after the bacteria-reducing treatment in step (4) is completed, the vacuum interface/gas outlet is connected with a vacuum pump at a bucket cover 503 of the tumbler and the tumbler is vacuumized, and when a vacuum degree reaches 0.05 MPa, the tumbler is rotated at 6 r/min for pickling for 3 h.

6) Sampling and cleaning, in which after the pickling is finished, the pickled aquatic products are taken out, clean water is injected into the tumbler through the marinade inlet and the tumbler is rotated to clean the tumbler.

7) drying and packaging, in which the products is dried by a heat pump, and the products after drying are vacuum packaged to obtain the dried products.

Embodiment 4

A method for rapid low-salted pickling of aquatic products based on the device specifically includes following steps:

1) Preliminary processing of raw materials in which inedible parts of fish meat to be pickled are removed, cleaned, cut into 5 cm×2 cm×2 cm pieces, and put into a material pretreatment bucket.

2) bacteria-reducing treatment with the plasma activation gas, in which the plasma power supply and control system is turned on to perform low-temperature plasma treatment on the pieces to be pickled in the tumbler. A plasma treatment voltage is 13000 V with a current of 80 mA and a frequency of 10 kHz. The plasma working gas is air, and a flow rate of the air injected into the tumbler is 2 L/min. The exhaust fan 504 is turned on, and the plasma activation gas in the tumbler is introduced into the gas treatment device 600. The nitrogen and oxygen adsorption device and the concentration detector, as well as the ozone decomposition device and the concentration detector are used to control concentration of the nitrogen and oxygen, and ozone ranging from several hundred ppb to several tens ppm. The exhaust fan 605 and the intake valve 700 of the material pretreatment bucket are turned on, and the gas circulation control valve 800 of the tumbler is turned off, and the processed plasma activation gas is introduced into the material pretreatment bucket to perform the bacteria-reducing treatment on the pieces to be pickled for 18 min.

3) Marinade adding and plasma treatment, in which the pieces which have been subjected to the bacteria-reducing treatment with the plasma activation gas are put into the tumbler for further pickling treatment. The marinade is prepared by adding salt and other ingredients to ultrapure water, with salt content less than 12% (the added salt accounted for about 5% of the total fish meat). The prepared marinade is injected into a cavity of the tumbler together with the plasma working gas through the marinade inlet, and low-temperature plasma treatment is performed at the same time, with same treatment conditions as those described in step (2). In this step, the intake valve 700 of the material pretreatment bucket is turned off, and the gas circulation control valve 800 of the tumbler is turned off, so that the pieces to be pickled in the material pretreatment bucket are subjected to the first bacteria-reducing treatment and the pieces in the tumbler are subjected to the second bacteria-reducing treatment.

4) Cyclic bacteria-reducing treatment with the plasma activation gas, in which after the plasma treatment is finished, the intake valve 700 of the material pretreatment bucket between the gas treatment device and the material pretreatment bucket is turned off, the gas circulation control valve 800 of the tumbler is turned on, and the plasma activation gas extracted from inside of the tumbler is passed through the exhaust fan 605 and the gas circulation pipe of the tumbler 801 to re-enter into the tumbler to form gas circulation, and this is the third bacteria-reducing treatment performed on the pieces. The treatment time is 25 min.

5) Vacuum pickling, in which after the bacteria-reducing treatment in step (4) is completed, the vacuum interface/gas outlet is connected with a vacuum pump at a bucket cover 503 of the tumbler and the tumbler is vacuumized, and when a vacuum degree reaches 0.2 MPa, the tumbler is rotated at 10 r/min in for pickling for 2.5 h.

6) Sampling and cleaning, in which after the pickling is finished, the pickled aquatic products are taken out, clean water is injected into the tumbler through the marinade inlet and the tumbler is rotated to clean the tumbler.

7) drying and packaging, in which the products is dried by a heat pump, and the products after drying are vacuum packaged to obtain the dried products.

A pickling speed of the above method is obviously increased, and storage experiments show that although the salt content of the pieces is obviously reduced, its shelf life is not significantly different from that of high-salted pickled pieces (Table 1).

TABLE 1

Salt content, total number of colonies and shelf life of samples in the embodiments 2-4 and a control sample

| Index | Salt content | Total number of colonies (CFU/g) | Shelf life/d | Saltiness |
|---|---|---|---|---|
| Control sample | 12.23% | 29045 | 45 | 5.17 |
| Embodiment 2 | 6.89% | 1273 | 55 | 4.99 |

TABLE 1-continued

Salt content, total number of colonies and shelf life of samples in the embodiments 2-4 and a control sample

| Index | Salt content | Total number of colonies (CFU/g) | Shelf life/d | Saltiness |
|---|---|---|---|---|
| Embodiment 3 | 6.52% | 1285 | 56 | 4.98 |
| Embodiment 4 | 7.03% | 1298 | 55 | 4.99 |

Note:
The total number of colonies refers to results measured in a first day of storage.

Determination Method

1. Determination of sodium chloride content, which refers to a method GB5009.44-2016 "Determination of sodium chloride in foods."
2. Determination of the total number of colonies, which refers to a method. GB4789.2-2016 "Determination of Total Number Colonies in Food Microbiology Examination."
3. Determination of the shelf life: According to GB 10136-2015 "National Food Safety Standard Animal Aquatic Products", when the total number of colonies exceeds a limit value, it is considered that a storage end point has been reached.
4. Saltiness evaluation: A sensory evaluation group composed of 14 pre-trained personnel (7 males and 7 females, with an average age of 24) was used to evaluate the saltiness of the samples of the embodiments and the control sample on a seven-point scale (1=very weak, 4=medium, and 7=very strong) and get an average value.

The above description is only the preferred embodiments of the present disclosure, and it is not intended to limit the present disclosure. Any modification, equivalent substitution, improvement, etc. made within the spirit and principle of this disclosure shall be encompassed within the protection scope of this disclosure.

What is claimed is:

1. A method for rapid low-salted pickling of aquatic products, wherein the method adopts a device for rapid low-salted pickling of aquatic products, the device comprises a pickling device, a plasma system, a gas circulation system, and a material pretreatment bucket; the pickling device comprises a tumbler and a vacuum pump; the plasma system comprises a plasma generating device, a plasma power supply and a controller; the gas circulation system comprises a gas inlet, a gas inlet pipe, an extraction fan, an extraction pipe, a gas treatment device, and an exhaust fan;

wherein the tumbler has a marinade inlet for introducing a pickling fluid, wherein the gas inlet is for introducing a plasma feeding gas, the introduced pickling fluid and plasma feeding gas are sprayed by a nozzle through the gas inlet pipe, and then uniformly distributed on surfaces of the aquatic products to be pickled through the plasma generating device, wherein the extraction fan is fixed at an inner position of a bucket cover of the tumbler, and is connected with the gas treatment device through a vacuum interface/gas outlet in the middle of the bucket cover, the concentrations of nitrogen, oxygen, and ozone in a plasma active gas are monitored and controlled by the gas treatment device;

wherein the exhaust fan comprises a first exhaust fan and a second exhaust fan, the first exhaust fan is fixed at an inner position of the bucket cover of the tumbler, and is connected with the gas treatment device through the vacuum interface/gas outlet in the middle of the bucket cover, and the second exhaust fan is arranged on a side of the gas treatment device away from the tumbler and connected with the extraction pipe, and the extraction pipe is divided into two branches, one of which is communicated with the material pretreatment bucket of the aquatic products before pickling, and the other of which is communicated with the extraction fan at the gas inlet;

wherein the method comprises:

1) preliminary processing of raw materials, wherein the preliminary processing comprises: removing inedible parts of the aquatic products to be pickled, cutting them into pieces after cleaning, and putting the pieces into the material pretreatment bucket;

2) bacteria-reducing treatment with the plasma active gas, in which the plasma active gas is introduced into the material pretreatment bucket to perform a first bacteria-reducing treatment on the aquatic products to be pickled;

at the same time, starting the plasma power supply and non-thermal plasma treatment on the aquatic products to be pickled, with a plasma treatment voltage of 12000-15000 V, a current of 60-80 mA, and a frequency of 8-10 kHz, wherein the first bacteria-reducing treatment is conducted for 15-20 min;

3) marinade adding and plasma treatment, comprising: putting the aquatic products which have been subjected to the first bacteria-reducing treatment into the tumbler; injecting the pickling fluid into the tumbler, wherein the flow rate of the pickling fluid is maintained at 0.5-0.8 L/min; injecting a plasma feeding gas into the tumbler, wherein the flow rate of the feeding gas is maintained at 1.5-2 L/min, this is a second bacteria-reducing treatment, with a treatment time of 15-20 min; and 4) cyclic bacteria-reducing treatment with the plasma active gas, in which after the second bacteria-reducing treatment is finished, gas valves between the extraction pipe and the material pretreatment bucket are closed, the extraction fan and the exhaust fan are turned on, and then the plasma active gas extracted from inside of the tumbler is passed through the exhaust fan, the gas treatment device and the gas inlet to re-enter into the tumbler to form a gas circulation driven by the extraction fan and the exhaust fan, and this is a third bacteria-reducing treatment, with a treatment time of 20-30 min; and 5) vacuum pickling, in which after the third bacteria-reducing treatment is completed, the vacuum interface/gas outlet at the bucket cover of the tumbler is connected with the vacuum pump and the tumbler is vacuumized, and the tumbler is kept being rotated to vacuum pickle the aquatic products therein for 2-3 hours, with a vacuum degree of 0.05-0.20 MPa and a rotating speed of 4-10 r/min.

2. The method for rapid low-salted pickling of the aquatic products according to claim 1, wherein conditions of the first bacteria-reducing treatment in step 2) are the same as those of the second bacteria-reducing treatment in step 3).

3. The method for rapid low-salted pickling of the aquatic products according to claim 1, wherein the pickling fluid consists of 20-30 parts of salt, 5-8 parts of potassium chloride, 1.5-4.5 parts of citric acid, 20-30 parts of white wine, 1-2 parts of fennel powder, 3-5 parts of pepper powder and 470-500 parts of water, by weights.

4. The method for rapid low-salted pickling of the aquatic products according to claim 3, wherein the pickling fluid is in a sterile environment with final salt content less than 12 wt. %.

5. The method for rapid low-salted pickling of the aquatic products according to claim 1, wherein the plasma feeding gas is one or any combination of air, nitrogen, oxygen and argon.

6. The method for rapid low-salted pickling of the aquatic products according to claim 1, further comprising step 6) and step 7) after step 5), wherein the step 6) and the step 7) comprise:
   6) sampling and cleaning, in which after the pickling is finished, the pickled aquatic products are taken out, clean water is injected into the tumbler through a marinade inlet and the tumbler is rotated to clean the tumbler; and
   7) drying and packaging, in which the pickled aquatic products are dried by a heat pump, and the dried aquatic products are vacuum packaged to obtain vacuumed aquatic products.

7. The method for rapid low-salted pickling of the aquatic products according to claim 1, wherein the gas inlet pipe is a hollow pipe composed of two tubes and the gas inlet pipe extends to the inside of the tumbler through a rotating roller, an outer end of the gas inlet pipe is provided with the gas inlet, and the marinade inlet is provided beside the gas inlet, and a plurality of gas outlets are provided at a part of an interior of the tumbler, the nozzle is provided at each of the gas outlets, and each nozzle is directly below the plasma generating device.

8. The method for rapid low-salted pickling of the aquatic products according to claim 1, wherein the plasma generating device is a non-thermal plasma generating device, and is connected with the plasma power supply and the control system by wires passing through the gas inlet pipe.

9. The method for rapid low-salted pickling of the aquatic products according to claim 1, wherein the gas treatment device comprising a nitrogen and oxygen adsorption device, a nitrogen and oxygen detector, an ozone decomposition device and an ozone concentration detector.

10. The method for rapid low-salted pickling of the aquatic products according to claim 1, wherein the non-thermal plasma treatment is performed while the pickling fluid is injected into the tumbler.

* * * * *